United States Patent [19]
Abele

[11] 3,920,779
[45] Nov. 18, 1975

[54] SUBMERSIBLE AERATOR

[75] Inventor: Thomas G. Abele, Dayton, Ohio

[73] Assignee: Tait Inc., Dayton, Ohio

[22] Filed: Dec. 17, 1973

[21] Appl. No.: 425,491

[52] U.S. Cl. .............. 261/87; 261/93; 261/DIG. 71
[51] Int. Cl.² .......................................... B01F 3/04
[58] Field of Search................ 261/87, 93, DIG. 71

[56] References Cited
UNITED STATES PATENTS

| | | | |
|---|---|---|---|
| 1,796,278 | 3/1931 | Bakewell | 261/87 |
| 2,928,665 | 3/1960 | Epprecht | 261/93 X |
| 3,385,576 | 5/1968 | Wikswo | 261/93 |
| 3,796,417 | 3/1974 | Kaelin | 261/93 |
| 3,813,086 | 5/1974 | Ebner et al. | 261/93 |

FOREIGN PATENTS OR APPLICATIONS 15,744   11/1956   Germany .............................. 261/87

*Primary Examiner*—Frank W. Lutter
*Assistant Examiner*—William Cuchlinski, Jr.
*Attorney, Agent, or Firm*—Biebel, French & Bugg

[57] ABSTRACT

An aerator particularly adapted for use in a sewage treatment system to draw air beneath the surface of the waste material in the system to promote aerobic decomposition of the waste material. The aerator is designed to draw high volumes of air into the sewage and to be relatively insusceptible to malfunction through clogging of the aerator with solid particles likely to be encountered in wastes of this type.

17 Claims, 3 Drawing Figures

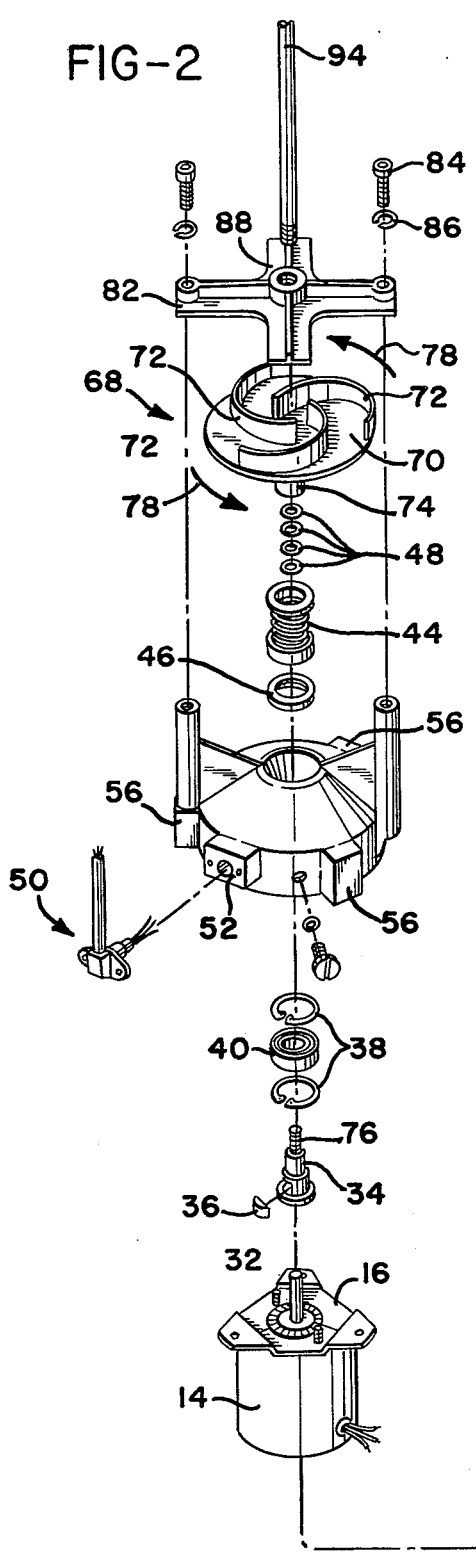
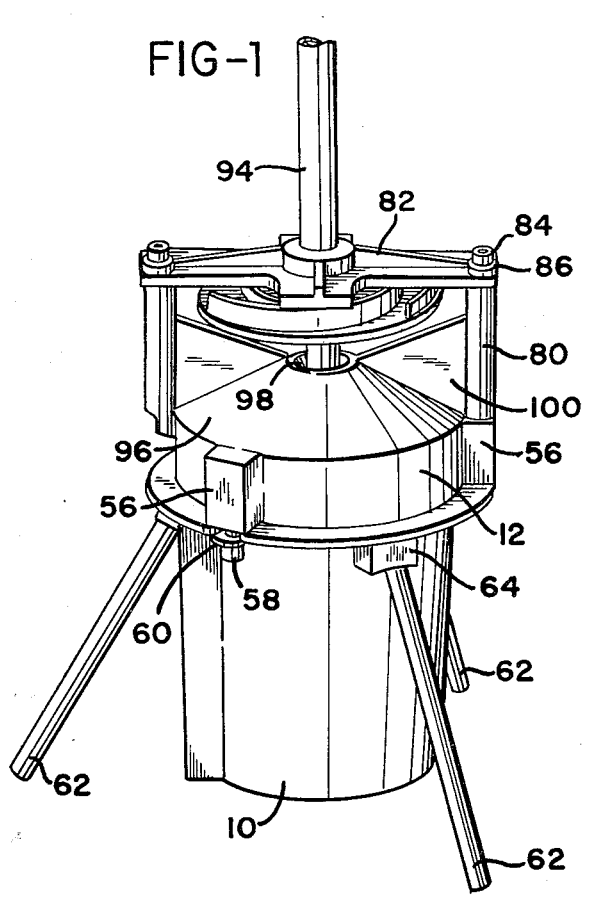
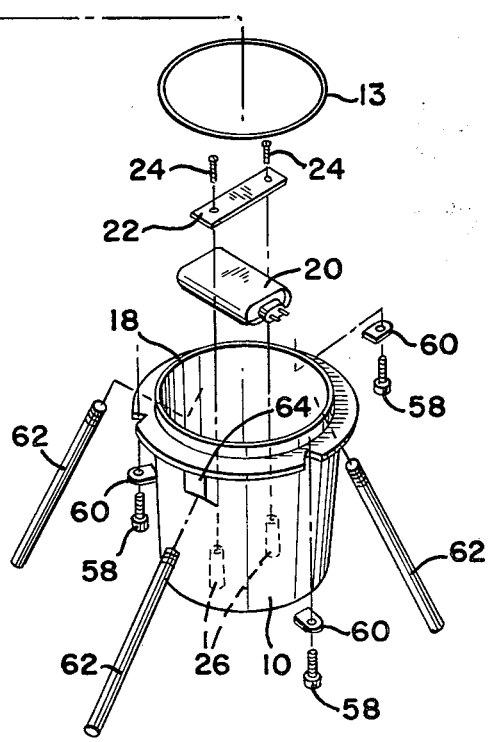

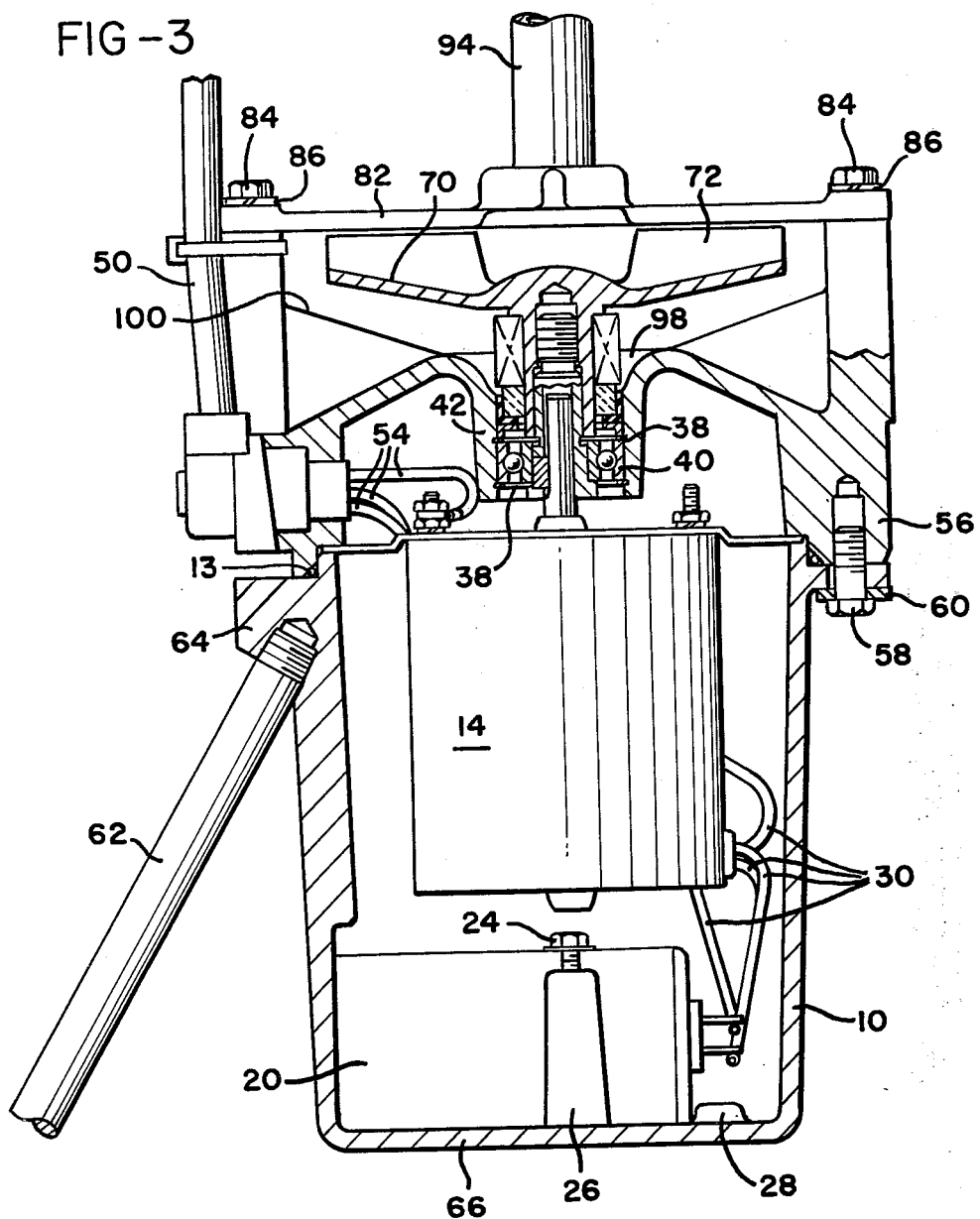

SUBMERSIBLE AERATOR

BACKGROUND OF THE INVENTION

Sewage treatment systems operating on an aerobic decomposition principal require a supply of oxygen to support the aerobic bacteria which decomposes the waste material.

While, from the standpoint of efficiency of the aerobic process alone, a supply of pure oxygen would be desirable, from a practical standpoint oxygen is usually supplied by drawing air into the sewage being treated.

For example, U.S. Pat. No. 3,051,315 discloses a system in which an air compressor pumps air into the sewage being treated through an air difuser in the form of a foraminous air stone. In another sewage treatment system shown in U.S. Pat. No. 3,210,053 air is drawn into the sewage by means of a mechanical aerating device which includes rotating air scoops and discharge terminals.

While prior art aerating devices do function to provide oxygen for the treatment process, it is, of course, desirable to be able to provide relatively high volumes of air and, hence, oxygen, to insure that the aerobic decomposition process is operating at maximum efficiency.

Additionally, since the aerating mechanism is to be submerged in the sewage, which, although primarily liquids, will include substantial portions of solids, the mechanism must be relatively insusceptible to clogging by solids encountered in the waste material.

SUMMARY OF THE INVENTION

The present invention provides a submersible aerator capable of delivering high volumes of air to a sewage treatment system to promote aerobic decomposition of the sewage and to operate with a minimum of maintenance and susceptibility to stoppage through clogging by solid particles.

Specifically, the aerator of the present invention includes an impeller having a plurality of spirally disposed vanes which are rotated in a direction such that any solids drawn into the impeller tend to be thrown outwardly with air drawn into the system by the impeller.

Although it appears somewhat anomalous, it has been found that for maximum operating efficiency, a substantial flow of liquid must be supplied to the impeller along with air. Thus, a shroud plate is provided, mounted in very closely spaced relationship to the upper surfaces of the vanes. The area of the shroud plate is substantially less than the area of the impeller to allow liquid to be drawn into the impeller along with the air drawn thereinto from an air intake line feeding through the center of the shroud plate.

To provide access of liquid to the impeller the shroud plate is formed in cross shape so that liquid may flow into the impeller between the legs of the cross. This form is provided rather than using a perforated or slotted shroud plate, because the large open areas between the legs of the shroud plate are not susceptible to clogging with solids, as would be the case with perforations or slots formed through the shroud plate.

Rotational power is supplied to the impeller by means of a permanently lubricated motor encased in a sealed housing which includes a motor end bell through which the motor shaft extends. The motor end bell is of a special configuration and not only supports the shroud plate at the desired location with respect to the impeller, but also prevents an accumulation of solids between the impeller and the motor end bell, provides ready access of liquid to the motor shaft seals and bearings, and prevents the formation of vortices in the area between the lower surface of the impeller and the upper surface of the end bell.

Thus, the motor end bell is provided with a pair of upwardly projecting posts which mount the shroud plate on their upper ends and position the shroud plate at the desired spacing with respect to the impeller.

Additionally, the motor end bell is provided with a central dished portion at the point through which the motor shaft extends through the motor end bell. This facilitates the access of cooling liquids to the motor shaft seals and bearings at the motor end bell.

Further, the upper surface of the motor end bell slopes downwardly and outwardly from the central dished portion to prevent an accumulation of solids in the space between the upper surface of the motor end bell and the lower surface of the impeller.

The formation of vortices in the space between the upper surface of the motor end bell and the lower surface of the impeller is believed to affect adversely the dispersal of air from the impeller. To prevent their formation fins are provided extending radially from inner surfaces of the shroud plate supporting posts to the upper surface of the motor end bell.

The fins also serve a further function in providing gusset reenforcement for the posts. While the fins are positioned between the motor end bell upper surface and the lower surface of the impeller there is a substantial gap between the fins and the lower surface of the impeller to reduce the possibility of solids clogging in this area.

Preferably the motor housing, rather than resting directly on the floor of the sewage treatment plant with which it is associated is provided with tripod legs which extend downwardly and outwardly from the housing and provide a stable support for the unit even though some irregularities may be encountered in the surface of the floor of the sewage treatment system.

Additionally, mounting sockets or abutments may be formed in the floor of the sewage treatment plant into which or against which the tripod legs may engage to further stabilize the aerator.

BRIEF DESCRIPTION OF THE DRAWINGS

FIG. 1 is a perspective view of an aerator in accordance with the present invention;

FIG. 2 is an exploded perspective view thereof; and

FIG. 3 is a cross sectional view thereof.

DESCRIPTION OF THE PREFERRED EMBODIMENT

As seen in the drawings the aerator of the present invention includes a housing having a lower portion 10 and an upper, motor end bell 12 having an O-ring 13 disposed therebetween. A motor 14 is installed in the housing by means of a bracket 16 mounted on an upper edge 18 of the portion 10 of the housing. A capacitor 20 is also received in the lower portion 10 of the housing and is secured therein by means of a strap 22 bolted by means of bolts 24 to bosses 26 cast in the lower portion of the housing 10. An additional boss 28 (FIG. 3) prevents the capacitor from sliding to the right as seen in FIG. 3 and shorting out the wires 30 interconnecting the capacitor 20 and the motor 14.

Shaft 32 of the motor is received in a shaft extension 34 which is keyed thereto by means of a shaft key 36. A pair of retaining rings 38 secure a bearing 40 within a collar portion 42 of the motor end bell and a seal 44 and seal retainer 46 are provided outwardly of the bearing to prevent entry of liquid into the bearing and motor housing. If necessary, shims, indicated at 48 in FIG. 2 of the drawings, may also be provided.

A cord and plug assembly, indicated in its entirety by the numeral 50 is attached to the motor end bell through a boss 52 and is electrically connected to the motor 14 as indicated at 54 in FIG. 3 of the drawings.

It will also be noted that the motor end bell 12 is provided with bosses 56 at regularly spaced intervals which have threaded openings in their lower surfaces to receive retaining bolts 58 and washers 60 to secure the lower portion 10 of the housing to the motor end bell 12.

Tripod legs 62 are threaded at their upper ends and received in threaded openings in bosses 64 formed in the lower portion 10 of the motor housing with the legs 62 extending downwardly and outwardly of the housing to support it with the lower surface 66 thereof spaced from the floor of the unit with which the aerator is used.

An impeller 68 consists of a circular plate 70 having a plurality of spirally, outwardly extending vanes 72 attached to an upper surface thereof and a mounting collar 74 extending from a lower surface thereof and internally threaded to receive the threaded end 76 of the shaft extension 34. The motor 14 drives the impeller 68 in a direction indicated by the arrows 78 so that any solid material drawn into the center of the impeller or coming in close proximity thereto is flung outwardly to clear the system.

The upper end of the motor end bell 12 is provided with a pair of upwardly projecting supporting posts 80 which are internally threaded to allow the shroud plate 82 to be mounted thereon by means of bolts 84 and lock washer 86. The shroud plate 82 is of cross shaped configuration with the legs of the cross joined by smoothly curved portions 88 to provide a smooth flow of liquid between the legs of the shroud plate and into the impeller to thereby increase the aerating efficiency of the unit.

The shroud plate 82 has an opening 90 formed therethrough, communicating with the center of the impeller 68 and internally threaded to receive the threaded lower end 92 of the air intake line 94. Thus, air is drawn through the intake line 94 and the opening 90 in the shroud plate 82 to the center of the impeller 68.

It will be particularly noted from the drawings that the upper surface 96 of the motor end bell 12 slopes downwardly and outwardly from a dished central portion 98 thereof. The dished central portion 98 provides ready access of cooling liquid to the seals and bearings for the motor shaft at the motor end bell while the slopped surface 96 prevents the build up of solid particles between the upper surface of the motor end bell and the lower surface of the impeller.

It will also be noted that radially disposed fins 100 extend between inner surfaces of the upwardly extending posts 80 and the upper surface of the motor end bell. Fins 100 prevent the build up of vortices in the area between the impeller and the motor end bell, which vortices are believed to adversely effect the dispersal of air from the top of the impeller.

From the above it will be apparent that the present invention provides a highly efficient and relatively maintenance free aerator particularly adapted for submersion in an aerobic sewage treatment process, although it will be apparent that the aerator of the present invention is capable of use generally in environments other than sewage treatment systems.

While the form of apparatus herein described constitutes a preferred embodiment of the invention, it is to be understood that the invention is not limited to this precise form of apparatus, and that changes may be made therein without departing from the scope of the invention.

What is claimed is:

1. A submersible aerator comprising:
   a. an impeller including a substantially circular plate member and a plurality of vanes mounted on an upper surface of said plate member and extending spirally outwardly from adjacent the center thereof,
   b. a motor connected to said impeller and adapted to rotate said impeller about an axis substantially coincident with the center thereof and in a direction such that outer ends of said vanes constitute trailing ends thereof,
   c. a motor housing including a motor end bell enclosing said motor,
   d. a shaft of said motor extending through said end bell and being provided with bearing and seal means at said end bell,
   e. an upper surface of said end bell having a central dished portion adapted to facilitate access of cooling liquid to said bearings and seals,
   f. said upper surface of said end bell sloping downwardly and outwardly away from said central dished portion to prevent accumulation of solids between said upper surface of said end bell and a lower surface of said plate of said impeller,
   g. a pair of posts projecting upwardly from said upper surface of said end bell adjacent the periphery thereof,
   h. a pair of radially disposed fins extending between inner surfaces of said posts and said upper surface of said end bell to prevent vortices between said upper surface of said end bell and said lower surface of said impeller plate,
   i. a shroud plate of substantially cross shaped configuration having a lower surface area less than the area of said impeller and having outer ends of two legs thereof attached to upper ends of said posts with a lower surface of said shroud plate in closely spaced relationship to upper surfaces of said impeller vanes,
   j. said shroud plate providing substantial open area between adjacent legs thereof with adjacent legs being joined by smoothly curved portions to permit entry of liquids to said impeller,
   k. an air intake line mounted on said shroud plate and communicating therethrough with said impeller at substantially said center thereof, and
   l. tripod legs projecting downwardly from said motor housing and supporting said motor housing with a lower surface thereof positioned above lower ends of said tripod legs.

2. A submersible aerator comprising:

a. an impeller including a plurality of outwardly projecting vanes,
b. said vanes extending substantially spirally outwardly from adjacent the center of said impeller toward the outer periphery thereof,
c. means for rotating said impeller about an axis substantially coincident with said center thereof in a direction such that outer ends of said vanes constitute trailing ends thereof,
d. said rotating means including a motor enclosed in a housing having an end bell positioned immediately beneath said impeller,
e. a motor shaft extending through said end bell and mounting said impeller thereon,
f. a shroud plate positioned above said vanes with a lower surface of said shroud plate in closely spaced relationship to said vanes,
g. means mounting said shroud plate on said end bell with said impeller interposed between said end bell and said shroud plate,
h. said shroud plate having a total lower surface area less than the total area of said impeller beneath said shroud plate, and
i. intake means for feeding gas through said shroud plate to said impeller at substantially said center thereof.

3. The aerator of claim 2 wherein said end bell comprises:
a. an upper surface sloping downwardly and outwardly away from the center thereof beneath said impeller to thereby prevent accumulation of solids between said end bell and said impeller.

4. The aerator of claim 3 wherein said end bell further comprises:
a. a dished central portion surrounding said motor shaft to provide ready access of cooling liquids for said shaft and seals and bearings associated therewith.

5. The aerator of claim 2 wherein said end bell comprises:
a. a dished central portion surrounding said motor shaft to provide ready access of cooling liquids for said shaft and seals and bearings associated therewith.

6. The aerator of claim 2 wherein said means mounting said shroud plate on said end bell comprises:
a. post means formed integrally with and projecting upwardly from an upper surface of said end bell, and
b. means attaching said shroud plate to upper ends of said upwardly projecting post means.

7. The aerator of claim 2 further comprising:
a. fins projecting upwardly from an upper surface of said end bell intermediate said end bell and a lower surface of said impeller to reduce vortices between said impeller and said end bell.

8. A submersible aerator comprising:
a. an impeller including a plurality of outwardly projecting vanes,
b. said vanes extending substantially spirally outwardly from adjacent the center of said impeller toward the outer periphery thereof,
c. means for rotating said impeller about an axis substantially coincident with said center thereof in a direction such that outer ends of said vanes constitute trailing ends thereof,
d. said rotating means including a motor enclosed in a housing having an end bell positioned beneath said impeller,
e. a motor shaft extending through said end bell and mounting said impeller thereon,
f. said end bell having a dished central portion surrounding said motor shaft to provide ready access of cooling liquids for said shaft and seals and bearings associated therewith,
g. a shroud plate mounted above said vanes with a lower surface of said shroud plate in closely spaced relationship to said vanes,
h. said shroud plate having a total lower surface area less than the total area of said impeller beneath said shroud plate, and
i. intake means feeding through said shroud plate to said impeller at substantially said center thereof.

9. The aerator of claim 8 wherein said end bell further comprises:
a. an upper surface sloping downwardly and outwardly away from the center thereof beneath said impeller to thereby prevent accumulation of solids between said end bell and said impeller.

10. The aerator of claim 9 further comprising:
a. fins projecting upwardly from an upper surface of said end bell intermediate said end bell and a lower surface of said impeller to reduce vortices between said impeller and said end bell.

11. A submersible aerator comprising:
a. an impeller including a plurality of outwardly projecting vanes,
b. said vanes extending substantially spirally outwardly from adjacent the center of said impeller toward the outer periphery thereof,
c. means for rotating said impeller about an axis substantially coincident with said center thereof in a direction such that outer ends of said vanes constitute trailing ends thereof,
d. said rotating means including a motor enclosed in a housing having an end bell positioned beneath said impeller,
e. a motor shaft extending through said end bell and mounting said impeller thereon,
f. said end bell having an upper surface sloping downwardly and outwardly away from the center thereof beneath said impeller to thereby prevent accumulation of solids between said end bell and said impeller,
g. a shroud plate mounted above said vanes with a lower surface of said shroud plate in closely spaced relationship to said vanes,
h. said shroud plate having a total lower surface area less than the total area of said impeller beneath said shroud plate, and
i. intake means feeding through said shroud plate to said impeller at substantially said center thereof.

12. The aerator of claim 11 further comprising:
a. fins projecting upwardly from an upper surface of said end bell intermediate said end bell and a lower surface of said impeller to reduce vortices between said impeller and said end bell.

13. A submersible aerator comprising:
a. an impeller including a plurality of outwardly projecting vanes,
b. said vanes extending substantially spirally outwardly from adjacent the center of said impeller toward the outer periphery thereof, c. means for rotating said impeller about an axis substantially coincident with said center thereof in a direction such that outer ends of said vanes constitute trailing ends thereof,
d. a shroud plate mounted above said vanes and having an opening formed therethrough substantially centrally thereof,
e. said shroud plate having a planar lower surface,
f. said shroud plate lower surface being disposed above and in closely spaced relationship to said vanes with said vanes moving across said lower surface of said shroud plate as said impeller is rotated about said axis,
g. said shroud plate lower surface including a centrally disposed portion positioned above and covering a central portion of said impeller,
h. said shroud plate having a total lower surface area less than the total area of said impeller beneath said shroud plate, and
i. intake means for feeding gas through said opening in said shroud plate to said impeller at substantially said center thereof.

14. The aerator of claim 13 wherein:
a. said shroud plate comprises a plurality of outwardly projecting legs intersecting adjacent said center of said impeller and providing open areas between adjacent legs for the flow of liquid to said impeller.

15. The aerator of claim 14 wherein:
a. said shroud plate is of substantially cross shaped configuration.

16. The aerator of claim 13 wherein said means for rotating said impeller comprises:
a. a motor,
b. a motor housing enclosing said motor and including an end bell positioned beneath said impeller, and
c. a motor shaft extending through said end bell and mounting said impeller thereon.

17. The aerator of claim 16 further comprising:
a. fins projecting upwardly from an upper surface of said end bell intermediate said end bell and a lower surface of said impeller to reduce vortices between said impeller and said end bell.

* * * * *